Feb. 9, 1932.  J. E. JEWETT  1,844,164
HIGH PRESSURE VALVE
Filed April 26, 1927
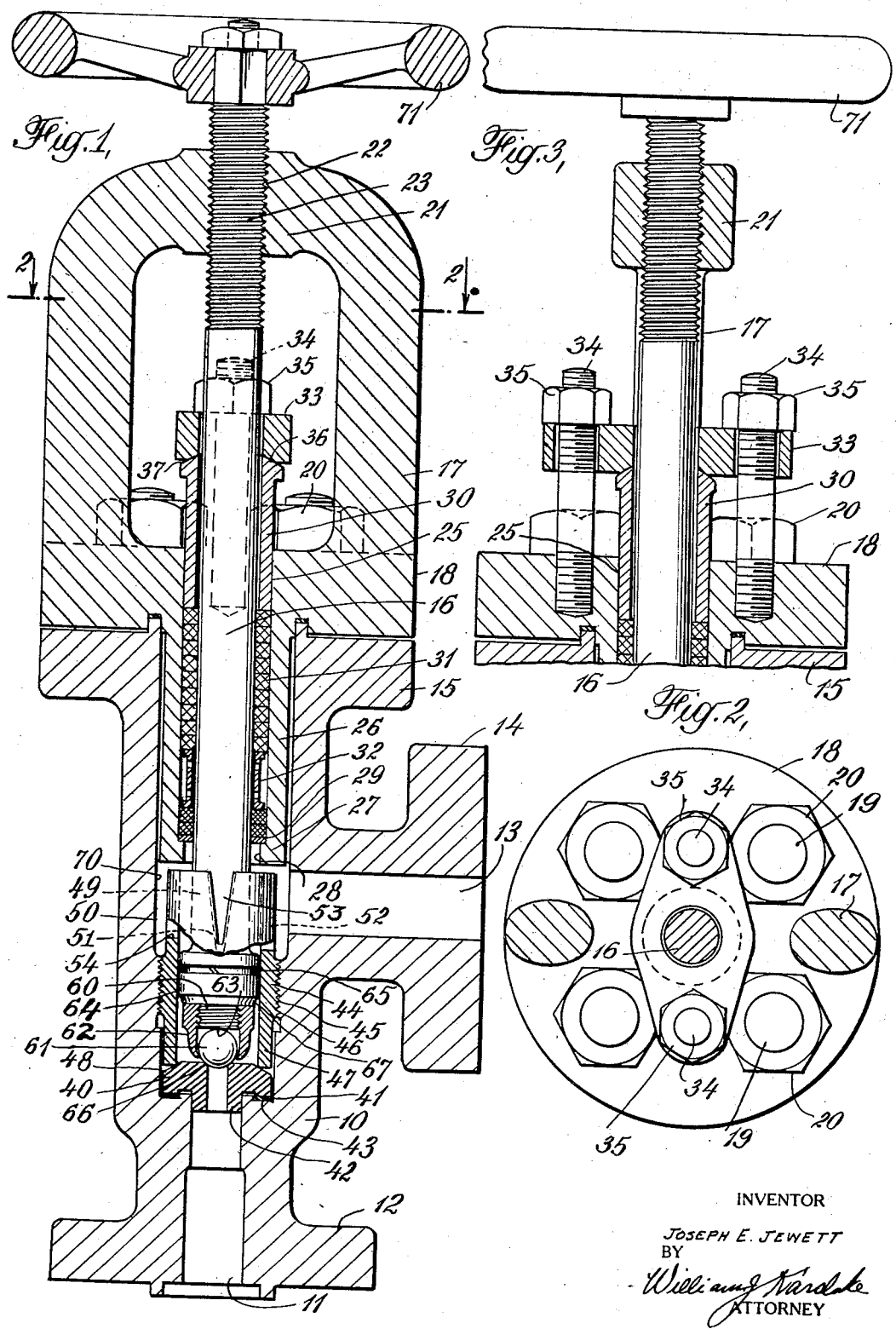
INVENTOR
JOSEPH E. JEWETT
BY
William J. Nardake
ATTORNEY Patented Feb. 9, 1932

1,844,164

UNITED STATES PATENT OFFICE

JOSEPH E. JEWETT, OF BUFFALO, NEW YORK, ASSIGNOR TO THE NATIONAL ANILINE & CHEMICAL COMPANY, INC., OF NEW YORK, N. Y., A CORPORATION OF NEW YORK

HIGH PRESSURE VALVE

Application filed April 26, 1927. Serial No. 186,660.

This invention relates to a valve for controlling fluids under high pressures.

High pressure fluids under the customary valve control escape with a sudden rush and a high velocity when the valve is first "cracked" or released from its seat, causing "wire drawing" over the seat and a consequent rapid deterioration of the valve elements. Furthermore, the sudden rush of fluid, when so released from its container, has a tendency to create disturbances in the container contents that may have objectionable effects.

The primary objects of this invention are a valve that provides a graduated release of a highly compressed fluid, and that avoids destruction of the valve closure elements. This is accomplished by separating the functions of maintaining a tight closure and of gradually releasing of the fluid, and interposing a time element or sequence with regard to them. For the closure, a ball valve and an associated seat is selected as affording an inexpensive but accurately fitted connection for maintaining a pressure-tight contact. For the gradual release, there is preferred a throttling means comprising a piston slidable within a cylinder having graduated or tapered openings therein. The sequence in operation of these closure and throttling means is made possible by extending the cylinder from the valve seat and placing the graduated openings in the portion of the cylinder distant from the seat so that releasing the valve from its seat does not result in any flow of fluid until the piston is moved sufficiently to uncover the openings in the cylinder; and similarly the flow is cut off by the piston while the valve is still distant from its seat. Such a sequence is conveniently and simply assured by mounting both the piston and the valve on a single operating means or stem, suitably spaced to operate as described.

In the accompanying drawings

Fig. 1 is a vertical central section of a valve embodying the invention;

Fig. 2 is a transverse section on the line 2—2 of Fig. 1; and

Fig. 3 is a vertical central section of the upper portion of the valve structure in a plane perpendicular to that of Fig. 1.

The valve body or casing 10 is a steel casting of sufficient strength to withstand the pressures involved. It may have any of the well-known valve-body shapes, and the one selected for illustration is a T-shaped casting with an inlet 11 at one end 12, an outlet 13 in the arm 14 intermediate the ends, and the other end 15 arranged to receive a valve operating stem 16. A yoke 17 extends from and is integral with a disc 18 that is mounted in pressure-tight contact with the end 15 of the valve body and that is secured thereto by stud bolts 19 and nuts 20 or other suitable means. The central portion 21 of the yoke is thickened and threaded at 22 to receive the screw portion 23 of the valve stem 16. A central opening 25 and a sleeve 26 extending from the disc 18 in alinement with the opening afford a passageway for the stem. The sleeve extends into the valve body, and its free end 27 has an inwardly extending flange 28 forming a support for a ring 29. A gland 30 about the stem projects through the opening 25 and into the sleeve, thereby constituting a stuffing box, and suitable packing 31 is disposed within the box including a lantern gland 32 stuffed with heavy grease. A header 33 is forced against the gland 30 by means of stud bolts 34 extending from the disc 18 and through the header, nuts 35 on the bolts contacting with the header. The contact surfaces 36 and 37 of the header and the gland are preferably spherical on a radius conforming to the distance of the bolts 34 from the gland axis to furnish an adequate surface of contact and avoid distortion. The above described construction supplies an assembly of valve operating means and stuffing box that can be disconnected from the valve body and thus give access to other parts of the valve by releasing the nuts 20 and without disturbing the assembly.

At the inlet end 11 of the valve body there is a removable disc-shaped valve seat 40 bearing against an annular surface or shoulder 41 within the valve body; the seat having a portion 42 extending into the inlet; a lead gasket 43 is interposed to insure a tight joint.

A hollow or annular cylinder 44 has an intermediate threaded portion 45 for engagement with internal threads 46 formed on the interior of the valve body. One end portion 47 of the cylinder contacts with and locks the seat 40 in place, and the contacted surface of the seat is preferably beveled or given a 30° incline contact, as at 48, to center the lower valve seat and secure an adequate seal. The other end portion 49 of the cylinder remote from the seat 40 is spaced from the wall 50 of the inlet passage and has tapered or V-shaped notches or slots 51, 52, 53, 54 cut therein forming lateral openings of successively decreasing depth.

The interior end 60 of the valve stem 16 carries a ball valve 61 which is loosely held thereto by a partially enclosing retainer 62 threaded on the end of the stem. Pressure is applied to the ball by the flat end surface 63 of the stem. The stem is also provided with a piston 64 adjacent the retainer slidable within the cylinder 44. A piston ring 65 is fitted on the piston. With the parts assembled, the ball valve 61 cooperates with the seat 40, the seat having a spherically ground contact surface 66 less than the diameter of the ball; and the piston 64 cooperates as a slide valve with the cylinder as its seat to form a throttle valve in which the notches are gradually uncovered when the piston is drawn through the cylinder. Because of the varying depth of the notches the piston at first uncovers but one of them, and the tapered sides of the notch form but a small orifice with the piston edge which increases in size as the notch is uncovered; the remaining notches are then likewise uncovered, one by one, with further movement of the piston, and consequently there is a gradual increase in the area of the opening from that of a very small orifice to that of the fluid passage. In order that the orifice may be well defined the operating corner or edge 67 of the piston is sharpened. With the proportions of the parts as illustrated in Fig. 1, it is apparent that the ball valve is removed a material distance from its seat before the edge 67 of the piston begins uncovering the notches.

To conserve space and also to avoid undue turbulence in the released fluids, the valve outlet 13 preferably extends from the valve passage space about the notched end of the cylinder. While the notches may be of any number, four are selected for convenience in manufacture and the one of greatest depth, 51, is disposed laterally of the outlet and in back as shown in Fig. 1, the next in depth, 52, is in line with and adjacent the outlet, the next, 53, is in front and laterally disposed, and the shallowest, 54, is most remote from the outlet. By this arrangement, the fluid is largely directed into the outlet.

A hand wheel 71 serves for rotating the stem and causing its consequent longitudinal movement due to the threaded engagement with the yoke. Other means well known for giving longitudinal movement with or without rotation of the stem, may be substituted, but the one selected for illustration possesses the advantages of simplicity and the use of the entire periphery of the edge 67 in conjunction with the notches for regulating the flow of fluid.

To open the valve, when connected in a high pressure line, the stem is rotated by the hand-wheel, and the threaded engagement of the stem and the yoke causes a longitudinal movement of the stem which releases the ball closure. Fluid is thus allowed to escape into the cylinder, but the presence of the piston bars further progress. With continued rotation and longitudinal movement of the stem the piston slides within the cylinder to uncover the end of the notch 51. Fluid thereupon escapes through the orifice thus formed by the notch and the sharp edge of the piston. Since the orifice opening is slight, the quantity of fluid initially escaping is relatively small and no appreciable disturbance in the fluid body is created; and, since the ball valve is an appreciable distance from its seat there is no sudden rush or rapid flow between the closure elements. Further movement of the stem gradually increases the orifice due to the diverging sides of the notch and the uncovering of the remaining notches; the fluid stream is thus gradually increased until the complete cross sectional area of the valve passage is utilized. In the closing movement the action is reversed, the fluid flow being gradually throttled until it is cut off by the piston, whereupon the ball is forced to its seat.

It is evident that all cutting action of fluids passing through this valve is exerted upon the piston and cylinder without affecting the main closure seat and disc, and that when wear on these parts becomes great enough to interfere with proper action they may be replaced.

I claim:

1. A valve comprising in combination a casing having a passage therethrough, a closure for said passage, throttling means associated with said passage, said means comprising an annular cylinder with a plurality of lateral openings of different depths at the end thereof, remote from said closure, said end being spaced from the passage, and a piston slidable within said cylinder in sealing relation therewith and adapted to cover and uncover said openings, and means for operating said closure and said throttling means in sequence.

2. A valve comprising in combination a casing having a passage therethrough, a closure for said passage, throttling means associated with said passage, said means comprising an annular cylinder with a plurality of lateral openings of different depths at the end thereof, remote from said closure, said end being spaced from the passage, and a piston slidable within said cylinder in sealing relation therewith and adapted to cover and uncover said openings, and means causing said closure to function when flow of fluid is prevented by said throttling means.

3. A valve comprising in combination a casing having a passage therethrough, a pair of valve seats within said passage, one of said valve seats comprising an annular cylinder having a plurality of openings of graduated size and of unequal depths at the end thereof, remote from the other valve seat, said end being spaced from the passage, throttling means associated therewith, a closure for the other of said valve seats, and means for operating said closure and said throttling means in sequence.

4. A valve comprising in combination a casing having a passage therethrough, and means within said passage for regulating the size thereof from a small orifice to the full capacity of said passage, said means comprising an annular cylinder having a plurality of longitudinal slots of different depths in one end thereof, said end being spaced from the passage, and a piston slidable within said cylinder in sealing relation therewith and adapted to cover and uncover said slots.

5. A valve comprising in combination a casing having a passage therethrough, a seat within the passage, an annular cylinder mounted within the passage and forming a continuation of said seat, said cylinder having its end remote from the seat spaced from the passage and with a lateral opening therein, a piston slidable within the cylinder, a closure element carried by the piston for cooperation with said seat, and means for reciprocating said piston and closure element within the cylinder.

6. A valve comprising in combination a casing having a passage therethrough with a constricted portion providing a shoulder within the passage, a seat bearing against the shoulder, an annular cylinder having a lateral opening therein and having a threaded engagement with the interior of the casing in sealing contact with said seat, a piston slidable within the cylinder in sealing relation therewith and adapted to cover and uncover said opening, a closure element carried by the piston for cooperation with said seat, and means for reciprocating said piston and closure element within the cylinder.

7. A valve comprising in combination a casing having a passage therethrough, a valve seat removably mounted within said passage, a hollow cylinder having a threaded imperforate portion engaging the interior of said casing and in sealing contact with said seat, said cylinder having a portion extending from said threaded portion spaced from the casing and with a graduated opening formed therein, a reciprocable stem extending through said casing and into said cylinder, a ball valve carried on the inner end of said stem for cooperation with said valve seat, and a piston on said stem and slidable within said cylinder, said piston being so located relative to said valve that when the latter is seated the piston is in contact with the imperforate portion of said cylinder.

8. A valve comprising in combination a casing, having a passage therethrough, a valve seat removably mounted within said passage, a hollow cylinder having a threaded imperforate portion engaging the interior of said casing and in sealing contact with said seat, said cylinder having a portion extending from said threaded portion spaced from the casing and with a graduated opening formed therein, a stem extending through said casing and into said cylinder, a ball valve carried on the inner end of said stem for cooperation with said valve seat, a piston on said stem and slidable within said cylinder, said piston being so located relative to said valve that when the latter is seated the piston is in contact with the imperforate portion of said cylinder, means for maintaining a pressure-tight contact between said piston and said cylinder, a yoke removably supported in a pressure tight union on said casing and having a stuffing box formed thereon extending into said casing, said stem extending through said stuffing box, a gland enclosing said stem and extending into said box, packing means confined by said gland within the box and about said stem, a header having a spherical surface contact with said gland, studs extending from said casing and through said header, nuts on said studs contacting said header, a threaded connection between said yoke and said stem, and means for rotating said stem.

9. A valve comprising in combination a casing having a passage therethrough, and means within said passage for regulating the size thereof from a small orifice to the full capacity of said passage, said means comprising an annular cylinder in engagement with the interior of the casing, an end portion of which is spaced from the wall of the casing and has a plurality of graduated slots at the end thereof, and a piston slidable within said cylinder in sealing relation therewith.

10. A valve comprising in combination a casing having a passage therethrough, a removable seat within said passage, means for retaining said seat in said passage, said means comprising a cylinder having a plurality of lateral openings of different depths therein, and closures for said seat and for said lateral openings.

11. A valve comprising in combination a casing having a passage therethrough, a removable seat within said passage, means for retaining said seat in said passage, said means comprising a cylinder having a plurality of graduated slots of successively decreasing depths therein, a closure for said seat, and throttling means associated with said cylinder.

12. A valve comprising in combination a casing having a passage therethrough including a lateral opening, a valve seat mounted in said passage, a hollow cylinder having a threaded part and engaging the inner portion of said valve seat and having a portion extending from said threaded part and spaced from the casing forming a passage connecting with said lateral opening, said cylinder having a graduated opening in the extending portion remote from said valve seat, a piston slidable within the cylinder in sealing relation therewith and adapted to cover and uncover said graduated opening, a closure element carried by said piston for cooperation with said seat, and means for operating said closure element and piston in sequence.

13. A valve comprising in combination a casing having a passage therethrough, and means within said passage for regulating the size thereof from a small orifice to the full capacity of said passage, said means comprising an annular cylinder having a plurality of longitudinal slots in one end thereof, said end being spaced from the passage, and a piston slidable within said cylinder in sealing relation therewith and adapted to cover and uncover said slots.

In testimony whereof I affix my signature.

JOSEPH E. JEWETT.